Patented June 24, 1930

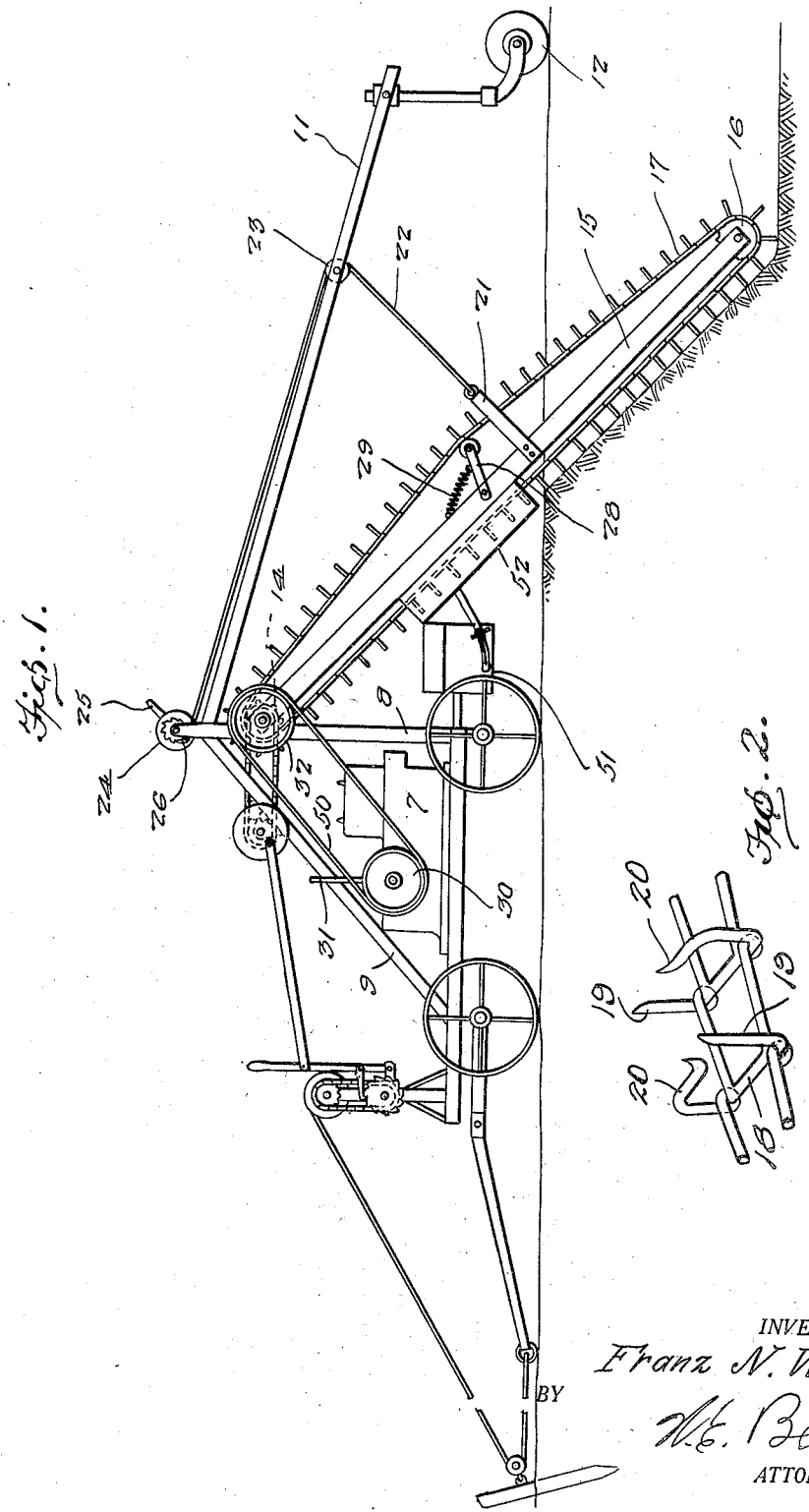

1,767,417

UNITED STATES PATENT OFFICE

FRANZ N. WEBER, OF DUNLAP, IOWA, ASSIGNOR OF ONE-HALF TO PETER WEBER, JR., OF DUNLAP, IOWA

DITCH DIGGER

Application filed February 2, 1927. Serial No. 165,421.

My invention relates to excavating machines and more particularly to trench or ditch diggers and has for its object to provide an apparatus of this character equipped with a special type of digging and excavating chain.

Other objects and advantages reside in the special construction, operation and arrangement of the elements forming the invention as more fully hereinafter described and claimed, reference being had to the accompanying drawing forming part hereof, wherein like numerals refer to like parts throughout, and in which Figure 1 is a side elevational view of the machine generally, and Figure 2 is a detail of a section of the digging chain.

Referring now to the drawings, wherein for the purpose of illustration I have shown a preferred embodiment of my invention, I provide a vehicle body or platform 5 mounted on wheels 6 at each end thereof and upon which is arranged a power plant 7 which may be of any suitable type such as a gas engine.

A frame is constructed on the body comprising a pair of vertical posts 8 near the rear of the body and forwardly inclined braces 9 attached near the top of said posts. A transverse beam 10 also connects the upper ends of the posts. An excavator hoisting arm 11 is attached at the upper ends of the posts and extends rearwardly and at one side of the machine and has its rear end provided with a trailer wheel 12.

A transverse shaft 13 is carried by the posts, upon which is rotatably arranged sprocket wheels 14 intermediate its ends. The shaft also pivotally supports one end of a pair of excavating chain supporting arms 15 which extend rearwardly from the machine and provided at their outer ends with sprocket wheels 16. An endless chain 17 is arranged on the sprockets 14 and 16 and having links with transverse sections 18 for engagement with the teeth of the sprockets and upwardly extending prongs 19, one of which has its end 20 extended inwardly substantially parallel with the section 18. The adjoining links are arranged with the inturned ends 20 oppositely formed so that each side of the chain is provided with an equal number of the inturned ends alternately arranged.

Intermediate the ends of the chain supporting arms is attached a yoke 21 to which a cable 22 is secured and extended upwardly over a pulley 23 carried by the hoisting arm 11 and forwardly to a windlass 24 mounted on top of the posts 8. A crank 25 is provided for the windlass and also a pawl 26 and ratchet 27 for retaining the excavating arms in a desired elevational position. A chain tightener 28 is pivotally attached to the chain supporting arms having a spring 29 for maintaining the proper tension on the chain.

A drive wheel 30 is operatively carried by the power plant under control by a clutch lever 31 and operates a belt wheel 32 mounted on one end of the shaft 13 by means of a belt 50, thus supplying power for driving the chain.

It will be apparent that upon the operation of the chain about the sprocket wheels that the prongs 19 at the ends of the links will dig into the earth and drag the same upwardly through a trough 52 into a hopper 51 where the earth is delivered into a chute 53 for discharge at one side of the vehicle.

I claim:

An excavating chain, adapted for operation through a sprocket wheel, comprising a plurality of interconnected links having bight sections engageable with the teeth of the sprocket wheel, each link being provided at said bight section with a pair of outwardly extending prongs bent at right angles to the bight section and disposed in spaced parallel relation, with each other, one of said prongs having its end turned toward said other prong and parallel to said bight section, and a pair of spaced parallel members extending from each bight section longitudinally of the chain for connection to an adjacent bight section.

In testimony whereof I affix my signature.

FRANZ N. WEBER.